Jan. 7, 1936.    McLENNEN C. SLATE    2,026,851
FUEL OIL GASIFYING DEVICE FOR COMBUSTION ENGINES
Filed Feb. 5, 1934    2 Sheets-Sheet 2
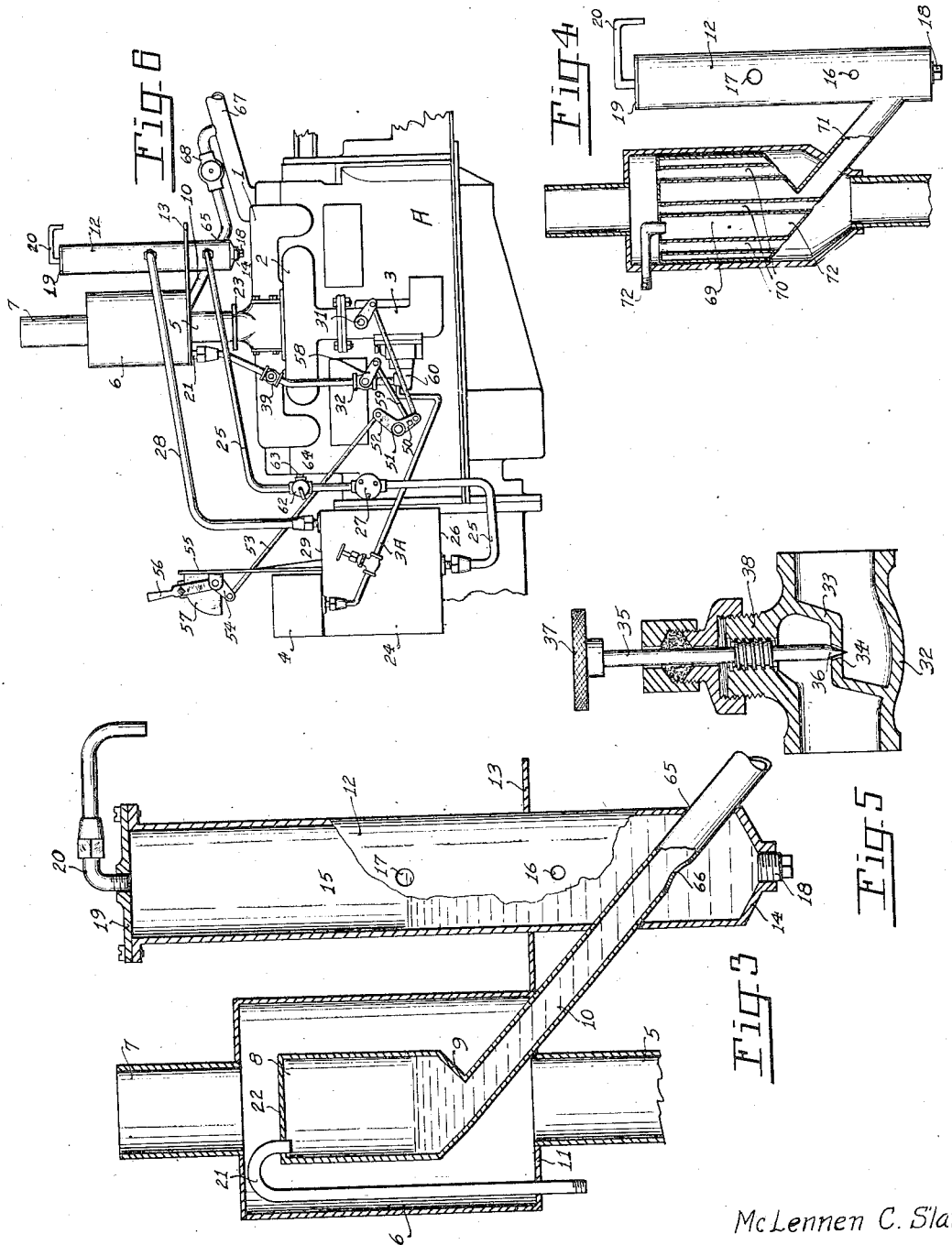
McLennen C. Slate
INVENTOR
Samuel S. Jacobson
ATTORNEY Patented Jan. 7, 1936

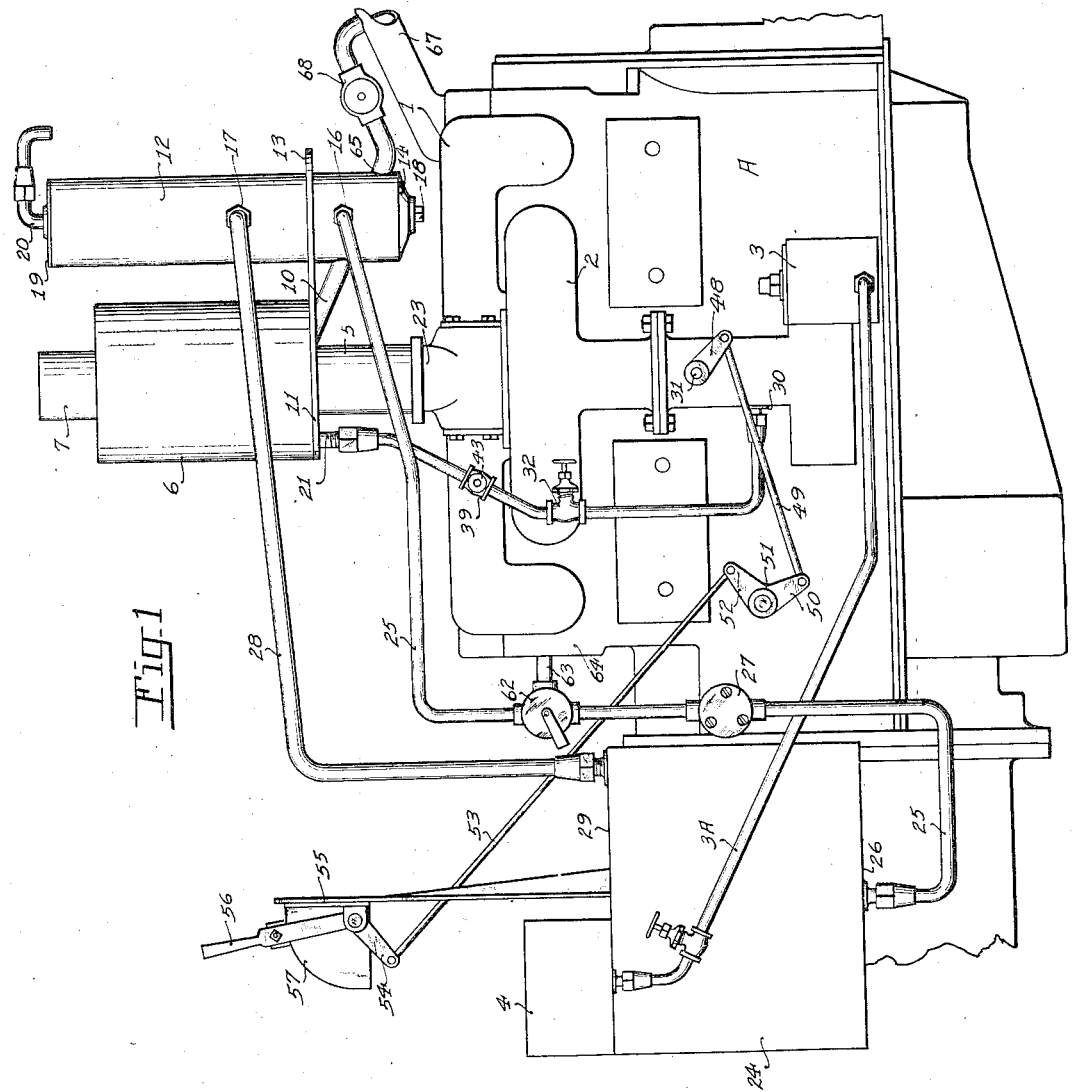

2,026,851

UNITED STATES PATENT OFFICE 2,026,851

FUEL OIL GASIFYING DEVICE FOR COMBUSTION ENGINES

McLennen C. Slate, Albany, Oreg., assignor to Slate Mfg. Co., Portland, Oreg., a corporation of Oregon Application February 5, 1934, Serial No. 709,900

2 Claims. (Cl. 123—133)

This invention relates generally to devices or apparatus attached to or made an integral part of any combustion engine, such as an internal combustion engine, whose primary purpose is to permit the substitution of low-grade fuel-oil, such as deisilite, for high-grade fuel, such as gasoline, as the medium by which the engine may be operated, and the invention relates particularly to a device or apparatus attachable to an internal combustion engine so that the exhaust gases coming from said engine are used as a medium by which low-grade fuel-oil is superheated to form a highly-heated gaseous fluid which is delivered to the intake manifold in a high state of combustibility.

The invention consists generally of a fuel-oil receptacle which is placed in the path of the exhaust gases coming from an internal combustion engine, an auxiliary-reservoir containing fuel-oil therein, means for delivering the fuel-oil into the receptacle at a rate of flow determinable by the pressure within the receptacle, and means for delivering the highly-heated gaseous fluid into the intake-manifold.

The primary object of my invention is to provide means to be used in conjunction with a standard internal combustion engine whereby the engine may be initially started with high-grade fuel and then, after the engine has been warmed up, substitute, in lieu thereof, fuel-oil of a cheaper grade which, before it is permitted to enter into the intake-manifold, is formed into a highly-heated combustible fluid by the exhaust gases which come in contact with a chamber containing said fuel-oil, without impairing the efficiency of the engine and yet materially reducing the cost of operation thereof.

An important object of the invention is to effectively pre-heat low-grade fuel-oil under normal atmospheric pressure by the utilization of the exhaust gases coming from an internal combustion engine so that a highly-heated gaseous fluid or "dry gas" is formed and delivered into the intake-manifold in a high state of combustibility.

Another object of the invention is to provide apparatus which is simple but durable in construction, which utilizes the heat of the exhaust gases of an internal combustion engine to turn fuel-oil into a high state of combustibility, which is economical to manufacture, which is easy to install or to remove and which is highly efficient in use.

A further object of the invention is to provide simple means for removing the residue created within the fuel-oil chamber when said fuel-oil is turned into gaseous fluid.

A still further object of the invention is to eliminate the present necessity of regulating the rate of flow of fuel-oil into the heating zone either by mechanical or thermostatic means, or the rate of flow of the exhaust gases toward the heating zone, or both.

Still another object of the invention is to provide means for preventing the creation of a vacuum within the fuel-oil chamber when the internal combustion engine is initially started with a high-grade fuel.

A further object of the invention is to provide manual means for regulating the proportion of the highly-heated gaseous fluid and air which are permitted to enter into the intake-manifold.

A very important object of the invention is to provide means for hydrostatically determining the amount of fuel-oil which should enter into the fuel-oil chamber once the internal combustion engine is initially started and heated.

These and other advantages will become apparent from, and a complete understanding of the invention and its merits may be had by, referring to the following description and the accompanying drawings which are merely illustrative of the manner by which I at present intend to carry the invention into effect, but which should not be considered a limitation of the invention, in which:

Figure 1 is a side elevation of an internal combustion engine of fanciful design, which has secured thereto apparatus embodying my invention.

Figure 2 is a sectional, side view of a one-way air-intake valve placed in the fuel-intake line as shown in Figure 1.

Figure 3 is a side elevation, partially in section, of a gasifying-unit embodying the preferred form of my invention.

Figure 4 is a side elevation, partially in section, of a gasifying-unit embodying a slightly modified form of my invention.

Figure 5 is a sectional, side view of a fuel-adjusting valve placed in the fuel-intake line as shown in Figure 1.

Figure 6 is a side elevation of an internal combustion engine identical in design to that shown in Figure 1, and embodying a gasifying-unit constructed in accordance with my invention and illustrating the remote-control means for operating both the fuel-intake valve and the air-intake valve.

Similar reference characters are employed in the following description to designate identical or corresponding parts when they appear in the several views of the drawings.

I have shown in the drawings the outline of an internal combustion engine, generally designated by reference character A, solely for the purpose of more graphically illustrating the relationship between an internal combustion engine and the apparatus embodying the principles of my invention since the precise construction of the engine forms no part of the present invention. Consequently, I assume that by such a disclosure no limitation will be read into this application which will limit the use of my invention, since, by a few minor changes, the invention can be used with other types of engines with equal facility. The internal combustion engine has an exhaust-manifold 1, an intake-manifold 2 and a carbureter 3 secured thereto in any conventional manner. All of these are of conventional design and no alterations are made thereto which would interfere with the flow of high-grade fuel, such as gasoline, from tank 4 to carbureter 3 through pipe 3A. The delivery of high-grade fuel from the tank to the carbureter may be either by vacuum, gravity or pump system without affecting the operation of my invention.

The construction of one form of apparatus is best illustrated in Figure 3, wherein exhaust-pipe 5 communicates with the casing or jacket 6 and an exhaust-pipe 7 extends upwardly from casing 6. A boiler or chamber 8 is disposed within and in spaced relationship to the inner wall of casing 6. The base 9 of the chamber 8 is funnel-shaped and has secured thereto conduit 10, which extends downwardly from and in an inclined plane to the base 9 of the chamber 8 and passes through the base 11 of casing 6.

An auxiliary-reservoir 12 is supported adjacent to, but in spaced relationship with, the casing 6 by any suitable means, as by support 13. The conduit 10 is secured to the auxiliary-reservoir near the base 14 thereof and communicates with its interior 15. Inlet opening 16 and outlet opening 17 are disposed through the wall of the auxiliary-reservoir in spaced relationship with each other. Attention is here called to the importance of properly positioning the auxiliary-reservoir with respect to the position occupied by the chamber 8 in the casing 6, since the volume of fuel-oil in the reservoir directly determines the volume of fuel-oil in the chamber prior to the initial starting of the internal combustion engine to which this apparatus is attached. However, after the engine is heated, the amount of pressure created in the chamber 8 directly determines the amount of fuel-oil allowed to enter into the chamber from the auxiliary-reservoir. The auxiliary-reservoir has a drain-plug 18 threadably disposed within its base, which permits the removal of any residue that has been created within the chamber 8, and which has been directed into auxiliary-reservoir by the inclined conduit 10. A plate 19 is removably disposed upon the top of the reservoir in any well-known manner and has a pipe-connection 20 threadably disposed therein which communicates with the interior 15 of the auxiliary-reservoir. By this construction approximately fifty per cent of the interior of the chamber is exposed to normal atmospheric pressure, which is very essential for the proper operation of the apparatus, as will appear later in the description.

A fuel-intake pipe 21 is secured to the top 22 of chamber 8 and communicates with the interior thereof. The fuel-intake pipe passes through the base 11 of casing 6.

The exhaust-pipe 5 is secured to exhaust-manifold 1 in any suitable manner, as shown at 23. The fact that the assembly previously described extends upwardly from the exhaust-manifold should not be considered a limitation of its use, since by the mere re-arrangement of parts to suit the needs of differently designed internal combustion engines, the operation of the gasifying-unit embodying the principles of my invention will not be affected in the least.

Fuel-oil is delivered to the auxiliary-reservoir 12 from storage-receptacle 24 by pipe-line 25, one end of which is secured to the base 26 of the receptacle and communicates with the interior thereof and the other end of which is secured to opening 16 of the auxiliary-reservoir 12. A pump 27 is inserted within pipe-line 25 so that the fuel-oil is forced to travel toward the reservoir. Since it is desired to retain only a certain amount of fuel-oil within the auxiliary reservoir 12, provision is made to continuously circulate the fuel-oil between the auxiliary-reservoir and the storage-receptacle by having a pipe 28 that has one of its ends connected to the opening 17 and communicating with the interior 15 of the reservoir 12 and the other end connected to the top 29 and communicating with the interior of the storage-receptacle 24. This return-pipe 28 is slightly larger than the delivery-pipe 25 in order to permit the easy draining of the overflow in the reservoir. Fuel-intake pipe 21 is connected to the intake-manifold 2, as shown at 30, so that it is immediately below the air-inlet valve 31, which assists in drawing the highly-heated gaseous fluid within the fuel-inlet pipe 21 into the intake-manifold 2. A regulating-valve 32 is placed in the fuel-intake line 21, so that the amount of highly-heated gaseous fluid entering into the intake-manifold 2 may be regulated. Any desirable valve may be used for this purpose, but I have shown in Figure 5 a valve which, I believe, is admirably adapted to regulate the rate of flow of the fuel within the fuel-intake pipe 21. This valve has a Z-shaped diaphragm 33 disposed therein. A conical-shaped valve-opening 34 is disposed within the diaphragm, and the valve-stem 35, having valve 36 at one end and knob 37 at the other, is threadably disposed with respect to the boss 38 of the valve-body, so that the valve 36 is in direct alignment with the valve-opening 34. It will be seen that by the turning of the knob 37, the valve is moved away from or toward the valve-opening 34, thereby regulating the rate of flow of the gaseous fluid.

In order to prevent a vacuum from being created within the chamber 8 immediately upon the starting of the internal combustion engine to which my apparatus may be attached, there is provided a one-way valve 39 graphically illustrated in cross-section in Figure 2. This valve is disposed in the fuel-intake line 21 and consists of a neck 40, which has a perforated diaphragm 41 disposed therein. A retaining-pin 42 extends upwardly from the diaphragm 41. A cap 43 is threadably disposed about the neck 40 and has a domed recess 44 therein. An orifice 45 communicates with the recess 44. A ball-valve 46 is normally maintained seated within the domed recess 44 by a resilient element such as spring 47. When the internal combustion engine is initially started and the air-intake valve opened, the vacuum created within fuel-intake line 21 causes the atmospheric pressure to force the ball-valve 46 away from the dome-seat 44, so that air may enter into the fuel-intake line 21. By this construction the creation of a vacuum within the chamber 8 is practically eliminated.

I have shown in Figure 1 the air-intake valve 31 as being manipulated independently of regulating-valve 32 by the use of an arm 48, having link 49 secured thereto. The free end of the link 49 is connected to arm 50 of bell-crank 51 and the other arm 52 of bell-crank 51 is secured to link 53, which, in turn, has its free end secured to lever 54 that is journaled to support 55. Throttle-control lever 56 is either secured to or made a part of lever 54 and is guided in its movement by segment 57.

This construction, however, is slightly modified, as shown in Figure 6, so that both the regulating-valve 32 and the air-intake valve 31 are operated by the same throttle-control lever 56. This is accomplished by placing the throttle-valve 32 so that the arm 58 attached thereto may have a link 59 secured therein with its free end attached to the arm 50 of bell-crank 51. This figure also shows a slight re-arrangement of parts so that the fuel-intake line is connected to and communicates with the venturi 60. In this manner the highly-heated gaseous fluid enters the carbureter before it reaches the intake-manifold.

I have refrained until now from describing and relating the additional functions which may be accomplished by slightly changing the line of travel of the fuel-oil from the storage-receptacle 24 to auxiliary-reservoir 12. A three-way valve 62 is interposed in pipe-line 25 above pump 27. A pipe 63 is connected to valve 62 and by this connection communicates with pipe-line 25. Pipe 63 is secured to and communicates with the cooling circulation system of the block 64.

Conduit 10 is extended through auxiliary-reservoir 12, as shown at 65, and communicates with the interior 15 thereof by an opening 66. Conduit 10 meets and communicates with the interior of the cooling-fluid outlet 67. A valve 68 is interposed in conduit 10.

This arrangement provides a substantially closed circuit through which the fuel-oil may travel and which includes not only the cooling system disposed in block 64, but also includes the radiator; and by this arrangement, it is possible to utilize the fuel-oil as a medium for cooling as well as for operating the engine. If it is desired to cut out the above-described circuit, it is only necessary to manipulate the valves 62 and 68, and the fuel-oil will then travel through pipe-line 25 into auxiliary-reservoir 12 in the manner heretofore described.

There is shown in Figure 4 a slightly modified form of a gasifying-unit embodying the principles of my invention, wherein a boiler 69 has a plurality of pipes or flues 70 extending therethrough. The inclined conduit 71 extends from the base of the boiler 69 and communicates with the interior 72 thereof. Fuel-intake pipe 73 is secured to the top of the boiler 69 and communicates with the interior 72 thereof. This construction increases materially the area which may be heated by the exhaust gases emanating from the internal combustion engine.

It is well to note here that the amount of fuel-oil that is permitted to enter into chamber 8 is controlled automatically by the difference between the pressure developed within the chamber and the normal atmospheric pressure within the auxiliary-reservoir. The rate of flow of the fuel-oil into the chamber is, therefore, hydrostatically controlled so that only the proper amount of fuel-oil is permitted to enter the chamber, thereby assuring the production of a highly-heated gaseous fluid free from impurities and highly combustible in nature.

Attention might well be called to the following advantages derived from the operation of the apparatus heretofore described and embodying the principles of my invention:

The residue formed in the chamber is permitted to flow back into the reservoir away from the heated area.

The fuel is constantly permitted to circulate between the auxiliary-reservoir and the fuel-tank, to thereby assure a constant and pre-determined supply of fuel-oil within the reservoir.

No liquid fuel-oil can flow into the intake-fuel line nor can foreign substances enter therein.

After the engine is heated, the pressure created within the chamber remains substantially constant, thereby assuring a continuous flow of highly-heated gaseous fluid toward and into the intake-manifold.

While the drawings, in the main, illustrate the preferred embodiment of the invention, it is to be understood that in adapting the means to meet specific needs, the design and various parts may be changed without departing from the spirit of the invention. I, therefore, do not limit myself to the precise construction illustrated and described but consider that I am at liberty to claim as my own all such changes and alterations as fairly come within the scope of the appended claims.

Having thus described my invention, what I claim as new and desire to secure by Letters Patent is:

1. In apparatus of the class described, the combination with the exhaust manifold of a combustion engine, a heating chamber disposed in said exhaust manifold directly in the path of the exhaust gases, said chamber having a conical base with an opening at the apex thereof, a conduit integral with the base of the chamber and extending at a substantially sharp inclination therefrom, said conduit having a cut out portion therein, an auxiliary fuel oil reservoir disposed adjacent to and in vertical alignment with the heating chamber, the conduit passing through the lower portion of the reservoir with the cut out portion communicating with the interior of said reservoir, a pipe connected to and communicating with the interior of the heating chamber at the top thereof and leading to the intake manifold of the combustion engine, said pipe adapted to deliver the gases from within the heating chamber to the intake manifold, means for automatically controlling the rate of flow of said gases, and hydrostatic means responsive to the pressure created within said heating chamber for controlling the flow of fuel oil into said chamber and for conducting the resultant gases under substantially uniform pressure from said chamber to said intake manifold.

2. In apparatus of the class described, the combination with the exhaust manifold of a combustion engine, a heating chamber disposed in said exhaust manifold directly in the path of the exhaust gases, said chamber having an inclined base, an auxiliary fuel oil reservoir disposed adjacent to said chamber, said reservoir having an intake line and overflow line connected thereto, a conduit made integral with but inclined downwardly from the base of the heating chamber, said pipe passing through and communicating with the interior of said reservoir, a pipe connected to and communicating with the interior of the heating chamber at the top thereof and leading to the intake manifold of the combustion engine, said pipe adapted to deliver the gases from within the heating chamber to the intake manifold, a valve in the pipe, an air inlet valve in the intake manifold, means for jointly regulating both of said valves for causing a proper mixture between the highly combustible fluid developed in the heating chamber and the air.

McLENNEN C. SLATE.